US007775429B2

(12) United States Patent
Radicella et al.

(10) Patent No.: US 7,775,429 B2
(45) Date of Patent: Aug. 17, 2010

(54) METHOD AND SYSTEM FOR CONTROLLING ACCESS TO AN ENCLOSED AREA

(75) Inventors: Michael Radicella, Golden, CO (US); Richard M. Burkley, Boulder, CO (US); Kriston L. Chapman, Lyons, CO (US); Shirl D. Jones, Lyons, CO (US); Roger Y. Matsumoto, Superior, CO (US)

(73) Assignee: Isonas Security Systems, Boulder, CO (US)

( * ) Notice: Subject to any disclaimer, the term of this patent is extended or adjusted under 35 U.S.C. 154(b) by 273 days.

(21) Appl. No.: 11/838,022

(22) Filed: Aug. 13, 2007

(65) Prior Publication Data

US 2008/0041943 A1 Feb. 21, 2008

Related U.S. Application Data

(60) Provisional application No. 60/822,595, filed on Aug. 16, 2006.

(51) Int. Cl.
*G06K 5/00* (2006.01)

(52) U.S. Cl. ...................................................... 235/380

(58) Field of Classification Search .................. 235/382
See application file for complete search history.

(56) References Cited

U.S. PATENT DOCUMENTS

| | | | | |
|---|---|---|---|---|
| 4,839,640 | A * | 6/1989 | Ozer et al. | 340/5.33 |
| 6,188,141 | B1 | 2/2001 | Daviaud | |
| 6,581,161 | B1 | 6/2003 | Byford | |
| 6,675,203 | B1 * | 1/2004 | Herrod et al. | 709/217 |
| 7,146,403 | B2 * | 12/2006 | Tock et al. | 709/206 |
| 2002/0087894 | A1 * | 7/2002 | Foley et al. | 713/202 |
| 2004/0223450 | A1 * | 11/2004 | Bridges et al. | 370/216 |
| 2007/0046424 | A1 * | 3/2007 | Davis et al. | 340/5.8 |
| 2007/0159304 | A1 * | 7/2007 | Agarwal et al. | 340/10.32 |
| 2007/0245158 | A1 * | 10/2007 | Giobbi et al. | 713/186 |

* cited by examiner

*Primary Examiner*—Daniel A Hess
*Assistant Examiner*—David Tardif
(74) *Attorney, Agent, or Firm*—Cooley LLP

(57) ABSTRACT

A method and system for controlling access to an enclosed area is described. One illustrative embodiment is an access card reader and controller that is powered via a Power-over-Ethernet (PoE) interface. The access card reader and controller may include a plurality of operating modes, including a network mode in which the access card reader and controller relies on an external access control server to authenticate received card identifiers and a standalone mode in which the access card reader and controller authenticates card identifiers independently of the access control server based on information stored locally in the access card reader and controller.

20 Claims, 6 Drawing Sheets

METHOD AND SYSTEM FOR CONTROLLING ACCESS TO AN ENCLOSED AREA

PRIORITY

The present application claims priority from commonly owned and assigned U.S. Provisional Application No. 60/822,595, entitled "Security Card Reader and Controller," filed on Aug. 16, 2006, which is incorporated herein by reference in its entirety.

FIELD OF THE INVENTION

The present invention relates generally to electronic security systems. In particular, but not by way of limitation, the present invention relates to methods and systems for controlling access to an enclosed area such as, without limitation, a building or a room within a building, a cabinet, a parking lot, a fenced-in region, or an elevator.

BACKGROUND OF THE INVENTION

Access control systems are commonly used to limit access to enclosed areas such as buildings, rooms within buildings, or fenced-in regions to only those people who have permission to enter. Conventional access control systems include access card readers at doors of the secured building. People who have permission to enter the building are provided an access control card that can be read by the access card readers. The card reader reads information from the card, and communicates the information to a control panel, which determines whether the door should be unlocked. If the door should be unlocked (i.e., the card is associated with a person who has permission to enter), the control panel then sends a signal to the locking mechanism of the door causing it to unlock. Conventional access control systems have several drawbacks and fail to take advantage of available modern technologies.

For example, in most conventional systems, radio frequency identification (RFID) is used for identification of the card to the access control system. The access card reader includes an RFID transceiver, and the access card includes an RFID tag or transponder. The RFID transceiver transmits a radio frequency query to the card as the card passes over it. The transponder includes a silicon chip and an antenna that enables the card to receive and respond to the RF query. The response is typically an RF signal that includes a pre-programmed identification (ID) number. The card reader receives the signal and transmits the ID number to the control panel via a wire connection. Conventional card readers are not very sophisticated. These card readers may perform some basic formatting of the identification data prior to sending it to the control panel, but are generally unable to perform higher level functions.

The control panel is typically mounted on a wall somewhere in the building. The control panel conventionally includes a bank of relays that are each controlled by a controller device. The controller device accesses memory to determine whether the identification number received from the card reader is recognized and valid. If so, the controller causes the associated relay to open (or close) to thereby send a signal to the door lock, which causes the lock to enter the unlocked state. The lock typically remains unlocked for a specified amount of time.

Conventional control panels have several drawbacks. For one, control panels consume a relatively large amount of space in relation to the number of doors they control. A control panel typically includes a specified number of relay banks, with each bank uniquely associated with the door it controls. For example, a control panel may have eight relay banks to control eight doors. Such a control panel could easily take up a 2 square foot area when mounted on a wall. If more than eight doors need to be controlled, then an additional control panel must be installed.

In addition, the "closed" architecture of conventional control panels make them inflexible, costly to maintain, and not user friendly. The closed architecture of the conventional control panels means that their design, functionality, specifications are not disclosed by the manufacturers or owners. In addition, control panel design is typically very complex, and specialized to a particular purpose, which renders them inaccessible by a typical building owner who has no specialized knowledge. As a result, when a control panel fails or needs to be upgraded, the building owner has no choice but to call a specialized technician to come onsite to perform maintenance or upgrading. The monetary cost of such a technician's services can be very high. In addition, a great deal of time could be wasted waiting for the technician to travel to the site.

It is thus apparent that there is a need in the art for an improved method and system for controlling access to an enclosed area.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

The present invention can provide a method and system for controlling access to an enclosed area. One illustrative embodiment is a method for controlling access to an enclosed area, comprising receiving a card identification signal including a card identifier (ID) in an access card reader and controller associated with an entrance to the enclosed area, the access card reader and controller being powered via a Power-over-Ethernet (PoE) interface; determining an operational mode of the access card reader and controller, the operational modes including a standalone mode and a network mode; authenticating the card ID by transmitting the card ID to an access control server when the access card reader and controller is determined to be operating in the network mode; authenticating the card ID against entries of one or more internal tables stored in the access card reader and controller when the access card reader and controller is determined to be operating in the standalone mode; and sending a signal to unlock a door at the entrance to the enclosed area associated with the access card reader and controller when the card ID has been successfully authenticated.

Another illustrative embodiment is a system for controlling access to one or more enclosed areas, the system comprising at least one access card reader and controller powered via a Power-over-Ethernet (PoE) interface, each access card reader and controller being capable of controlling access through a particular entrance to a particular enclosed area; and an access control server in communication with the at least one access card reader and controller, the access control server being capable of controlling the operation of the at least one access card reader and controller; wherein, in a network mode of operation, the access control server is configured to perform authentication of a card identifier (ID) received from the at least one access card reader and controller and to signal the at least one access card reader and controller to unlock a door at the particular entrance to the particular enclosed area when the access control server has successfully authenticated the received card ID; and wherein, in a standalone mode of operation, the at least one access card reader and controller is configured to perform local authentication of a received card ID independently of the access control server and to unlock a door at the particular entrance to the particular enclosed area when the at least one access card reader and controller has successfully authenticated the received card ID.

These and other embodiments are described in further detail herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings, wherein:

DETAILED DESCRIPTION

Prior to describing one or more preferred embodiments of the present invention, definitions of some terms used throughout the description are presented.

DEFINITIONS

A "module" is a self-contained functional component. A module may be implemented in hardware, software, firmware, or any combination thereof.

The terms "connected" or "coupled" and related terms are used in an operational sense and are not necessarily limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may," "can," "could," or "might" be included or have a characteristic, that particular component or feature is not required to be included or have the characteristic.

The terms "responsive" and "in response to" includes completely or partially responsive.

The term "computer-readable medium" is a medium that is accessible by a computer and can include, without limitation, a computer storage medium and a communications medium. "Computer storage medium" generally refers to any type of computer-readable memory, such as, but not limited to, volatile, non-volatile, removable, or non-removable memory. "Communication medium" refers to a modulated signal carrying computer-readable data, such as, without limitation, program modules, instructions, or data structures.

Exemplary System

Figure 1:
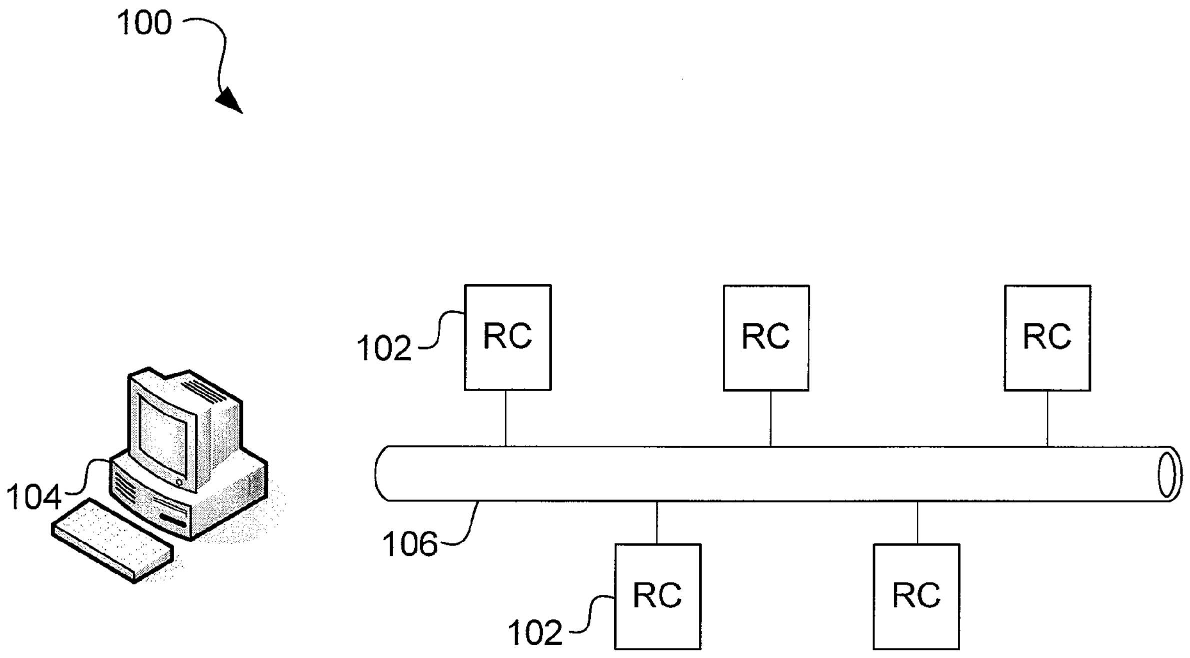
FIG. 1 schematic diagram illustrating primary components in an access control system in accordance with one embodiment with the present invention.

FIG. 1 schematic diagram illustrating primary components in an access control system 100 in accordance with one embodiment with the present invention. One or more access card reader/controllers 102 are in operable communication with a backend control system, such as an access control server 104, via a communication channel 106. Each of the access card reader/controllers 102 is associated with, and controls access through, a door (not shown). Herein, "door" is used in its broad sense to include, without limitation, an exterior door to a building, a door to a room within a building, a cabinet door, an elevator door, and a gate of a fence. Unlike conventional access card readers, the access card reader/controllers 102 each are operable to determine whether to unlock or lock the access card reader/controller's associated door. The access control server 104 is operable to perform management and configuration functions with respect to the access card reader/controllers 102.

The communication channel 106 may be either wired or wireless. In a wireless implementation, there is no need for a dedicated wire connection between each of the access card reader/controllers 102 and the access control server 104. As such, a wireless implementation can reduce implementation complexity and the number of points of potential failure that can exist in conventional systems. The wireless channel 106 can operate with a number of communication protocols, including, without limitation, transmission control protocol/Internet protocol (TCP/IP).

In some embodiments, access card readers operate in a synchronous mode, in which they are periodically polled by the primary access control device 104, and respond with their ID. Such polling can be an inefficient use of network bandwidth. Therefore, in accordance with various embodiments, the access control system 100 can operate in an asynchronous mode, as well as a synchronous mode. In the asynchronous mode, there is no need for the access control server 104 to periodically poll the access card reader/controllers 102. As such, network traffic is beneficially reduced in comparison to network traffic in a synchronous mode, in which polling is required. The asynchronous embodiment can also improve performance since events at the reader/controllers are reported immediately without waiting for the computer to poll for information.

In accordance with at least one embodiment, the system 100 implements programmable failure modes. As discussed further below, one of these modes is a network mode, in which the access control server 104 makes all decisions regarding locking and unlocking the doors; another mode is a standalone mode, in which each access card reader/controller 102 determines whether to unlock or lock a door, based on information in a memory local to the access card reader/controller 102.

In various embodiments, multiple access card reader/controllers 102 employ ZigBee functionality. In these embodiments, the access card reader/controllers 102 and the access control server 104 form a ZigBee mesh network. ZigBee functionality is discussed in more detail further below with reference to FIGS. 2-3.

Figure 2:
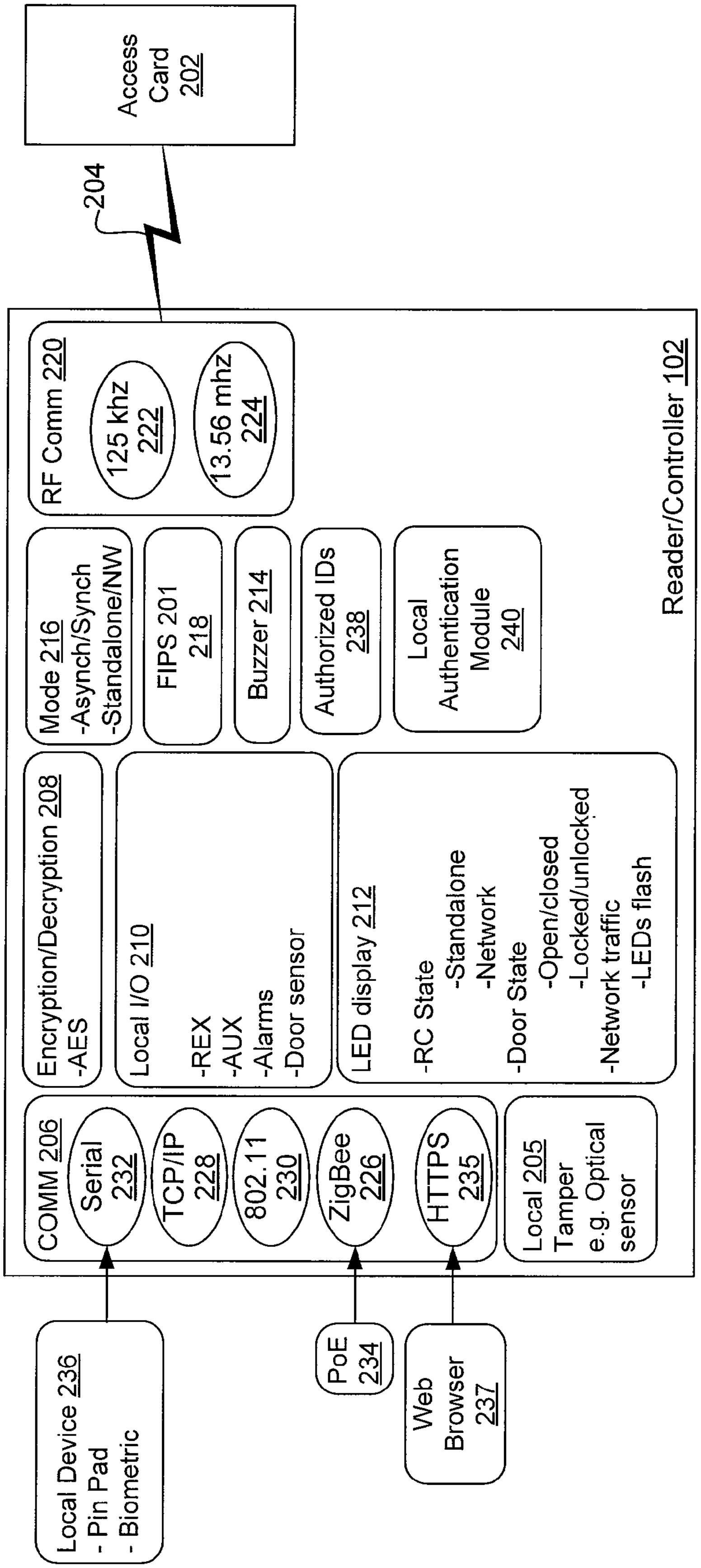
FIG. 2 is a functional block diagram illustrating functional modules that are included in a reader/controller in accordance with one embodiment.

FIG. 2 is a functional block diagram illustrating functional modules that are included in a reader/controller 102 in accordance with one embodiment. An access card 202 is shown emitting an RF signal 204 to the reader/controller 102. The RF signal 204 includes information including, but not limited to, identification (ID) information. Among other functions, the access card reader/controller 102 uses the RFID signal 204 to determine whether to unlock the door. The access card reader/controller 102 also performs other functions related to configuration, network communications, and others.

In this regard, the access card reader/controller 102 includes a number of modules including a local tamper detector 205, a device communication module 206, an encryption module 208, local input/output (I/O) 210, an LED display module 212, a buzzer module 214, a mode module 216, a federal information processing standard (FIPS) module 218, and an RF communication module 220.

In some embodiments, the access card reader/controller 102 reads RFID signal 204 at a single frequency—for example, a frequency of either 13.56 MHz or 125 kHz. In other embodiments, the reader/controller may include a dual reader configuration wherein the reader/controller can read at two frequencies, such as 125 kHz and 13.56 MHz. As such, in these embodiments, the RF communication module 220 includes a 125 kHz RF communication interface and a 13.56 MHz communication interface 224.

The local tamper detector 205 can detect when someone is attempting to tamper with the access card reader/controller 102 or with wires leading to or from the reader/controller 102, in order to try to override the control system and break in. In various embodiments, the local tamper detector 205 comprises an optical sensor. If such tampering is detected, the access card reader/controller sends a signal to the door locking mechanism that causes it to remain locked, despite the attempts to override the controller. For example, the optical tamper sensor 205 could send a signal to the local I/O module 210 to disable power to the door lock.

The device communication module 206 includes a number of modules such as a ZigBee module 226, a TCP/IP module 228, an IEEE 802.11 module 230, serial module 232, and HTTPS (secure Hypertext Transfer Protocol—HTTP) module 235. In some embodiments, communication module 206 supports both HTTP and HTTPS protocols. Each of the foregoing communication modules provides a different communication interface for communicating with devices in accordance with its corresponding protocol or format.

With regard to the ZigBee communication interface 226, a ZigBee protocol is provided. ZigBee is the name of a specification for a suite of high level communication protocols using small, low-power digital radios based on the IEEE 802.15.4 standard for wireless personal area networks (WPANs). ZigBee protocols generally require low data rates and low power consumption. ZigBee is particularly beneficial in an access control environment because ZigBee can be used to define a self-organizing mesh network.

In a ZigBee implementation, the access control server 104 acts as the ZigBee coordinator (ZC). One of the access card reader/controllers is the ZigBee end device (ZED). The other ZigBee access card reader/controllers are ZigBee routers (ZRs). The ZC, ZED, and ZRs form a mesh network of access card reader/controllers that are self-configuring. A ZigBee network is also scalable, such that the access card reader/controller network can be extended. In one embodiment, ZigBee is implemented in the access card reader/controller with a ZigBee chip.

The ZigBee interface 226 interfaces with Power-over-Ethernet (PoE) 234. PoE or "Active Ethernet" eliminates the need to run separate power cables to the access card reader/controller 102. Using PoE, system installers run a single CAT5 Ethernet cable that carries both power and data to each access card reader/controller 102. This allows greater flexibility in the locating of access points and reader/controllers 102, and significantly decreases installation costs in many cases. PoE 234 provides a power interface to the associated door locking mechanism, and also provides power to the components of the access card reader/controller 102. In other embodiments, a communication interface other than PoE that provides power without the need for separate power cables may be used to power the access card reader/controllers 102.

The IEEE 802.11 interface 230 provides communication over a network using the 802.11 wireless local area network (LAN) protocol. The TCP/IP interface 228 provides network communication using the TCP/IP protocol. The serial interface 232 provides a communication to other devices that can be connected locally to the access card reader/controller 102. As one example, a serial pin pad 236 could be directly connected to the reader/controller 102 through the serial interface 232. The serial interface 232 includes a serial chip for enabling serial communications with the reader/controller 102. As such, the serial interface 232 adds scalability to the reader/controller 102.

HTTPS module 235 allows reader/controller 102 to be configured via a Web-based user interface. HTTPS module 235 includes minimal but adequate server software or firmware for serving one or more Web pages to a Web browser 237 associated with a remote user. The remote user can configure the operation and features of reader/controller 102 via the one or more Web pages served to the Web browser 237.

The encryption/decryption module 208 provides for data security by encrypting network data using an encryption algorithm, such as the advanced encryption standard (AES). The encryption/decryption module 208 also decrypts data received from the network. As discussed further below, the access control server 104 also includes corresponding encryption/decryption functionality to facilitate secured network communication. Other forms of secure data transfer that may be implemented include wired equivalent privacy (WEP), Wi-Fi protected access (WPA), and/or 32 bit Rijndael encryption/decryption.

The local I/O module 210 manages input/output locally at the access card reader/controller 102. More specifically, the local I/O module 210 includes functionality to lock and unlock the door that is controlled by the access card reader/controller 102. In this respect, the local I/O module 210 receives as inputs an auxiliary signal, a request/exit signal, and a door sensor signal. The local I/O module 210 includes a door sensor to detect whether the door is closed or open. The local I/O module 210 includes (or controls) on board relays that unlock and lock the door. The local I/O module 210 can output one or more alarm signal(s). With regard to alarm signals, in one embodiment, two transistor-to-transistor logic (TTL) voltage level signals can be output to control alarms.

The light-emitting diode (LED) module 212 controls a display at the access card reader/controller 102. A number of indicators can be presented at the reader/controller 102 to indicate mode, door state, network traffic, and others. For example, the mode may be standalone or network. In network mode, the access control server 104 makes determinations as to whether to lock or unlock the door. In standalone mode, the local authentication module 240 of reader/controller 102 determines whether to lock or unlock the door using a set of authorized IDs 238 for comparison to the ID received in the signal 204. The LED display module 212 interacts with the mode module 216 for mode determination.

The LED display module 212 also interacts with the local I/O module 210 to determine the state of the door and displays the door state. Exemplary door states are open, closed, locked, and unlocked. LED lights can flash in various ways to indicate network traffic. For example, when the bottom LED is lit red, the reader/controller is in network mode and at a predefined interval set by the user, the top LED can flash an amber color to indicate the network is still active. The LED display module 212 interacts with the device communication module 206 to indicate network traffic level.

The mode module 216 determines and/or keeps track of the mode of operation. As discussed above, and further below, the access control system can operate in various modes, depending on the circumstances. In the illustrated embodiment, the four modes are asynchronous, synchronous, standalone, and network. It is possible to be in different combinations of these modes; i.e., to be in a hybrid mode. For example, it is possible to be in an asynchronous, standalone mode. It is also possible to be in either the asynchronous mode or synchronous mode, while in the network mode.

In the network mode, the access control server 104 makes all decisions as to whether to unlock and lock the doors for all reader/controllers 102. The reader/controllers 102 monitor the access control server 104. If the access control server 104 does not communicate for a specified time duration, the reader/controller 102 enters standalone mode. In standalone mode, the reader/controller 102 makes the decisions as to whether to unlock or lock the door based on the authorized IDs 238 stored at the reader/controller 102 independently of access control server 104.

In standalone mode, the reader/controller 102 broadcasts information. The information may include identification data, mode data, door state data, or other information. The information is broadcasted asynchronously. The system is operable to automatically recover from a situation in which the access control server 104 crashes. For example, while the reader/controllers 102 asynchronously broadcast, the server 104 may come back online and detect the transmissions from the reader/controllers. The server 104 can then resume data transmissions to re-enter the network mode. Of course, the system 100 can remain in the standalone mode.

In the network mode, the reader/controllers 102 may be synchronously polled by the server 104. The server 104 may send commands to the reader/controllers 102 to transmit specified, or predetermined data. This process serves a heartbeat function to maintain communication and security functionality among the reader/controllers 102 and the access control server 104.

The FIPS module 218 implements the FIPS standard. As such the system 100 and the individual reader/controllers 102 are in compliance with the FIPS standard, promulgated by the federal government. The FIPS standard generally specifies various aspects of the access card 202 layout and data format and storage. The FIPS module 218 supports access cards 202 that implement the FIPS standard and functions accordingly.

Figure 3:
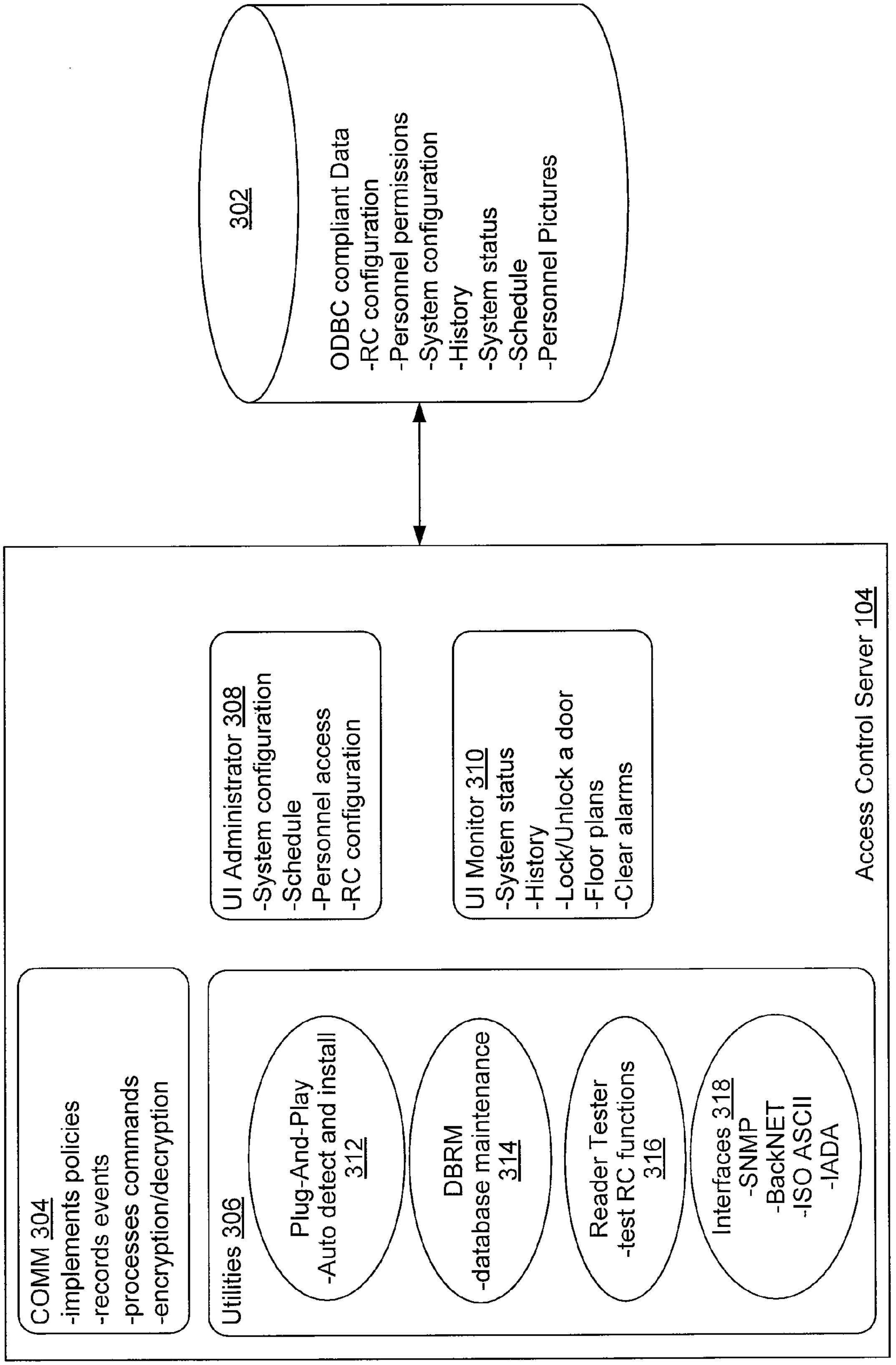
FIG. 3 is a functional block diagram illustrating functional modules that are included in an access control server in accordance with one embodiment.

FIG. 3 is a functional block diagram illustrating functional modules that are included in an access control server 104 and a database 302 in accordance with one embodiment. The server 104 includes a number of functional modules, such as a communication module 304, a utilities module 306, a user interface (UI) administrator 308, and a UI monitor 310. The database 302 stores various types of data that support functions related to access control.

More specifically, in this particular embodiment, the database 302 is open database connectivity (ODBC) compliant. The database 302 stores a number of types of data including, but not limited to, reader/controller configuration data, personnel permissions, system configuration data, history, system status, schedule data, and personnel pictures. The server 104 uses this data to manage the access control system 100.

The communication module 304 communicates with reader/controllers 102 using any of various types of communication protocols or standards (e.g., TCP/IP, 802.11, etc.). The communication module 304 implements policies that prescribe the manner in which access control communications or decision-making is to occur. For example, the communication module 304 may prescribe the order in which the different modes will be entered, depending on the circumstances.

The communication module 304 also records events that occur in the environment. Events may be the time and date of entry or leaving, the names of persons entering or leaving, whether and when a tampering incident was detected, whether and when standalone mode (or other modes) were entered, configuration or settings at the time of any of the events, and others. The communication module 304 also processes commands and responses to and from the reader/controllers 102. The communication module 304 performs network data encryption and decryption corresponding to that carried out by the reader/controllers 102.

The utilities module 306 includes a number of functional modules for implementing various features. For example, a plug-and-play utility 312 automatically detects addition of a new reader/controller 102 and performs functions to facilitate installation of the new reader/controller 102. Thus, the plug-and-play utility 312 may assign the new reader/controller 102 a unique network ID.

A database request module (DBRM) 314 performs database 302 management, which may include retrieving requested data from the database 302 or storing data in the database 302. As such, the DBRM 314 may implement a structured query language (SQL) interface.

A reader tester module 316 tests reader/controller functions. The reader tester 316 may periodically test reader/controllers 102, by querying them for certain information, or triggering certain events to determine if the reader/controllers 102 behave properly. The tester 316 may test the reader/controllers on an event-by-event basis, rather, or in addition to, a periodic basis.

An interfaces module 318 provides a number of communications interfaces. For example, a simple network management protocol may be provided, as well as a BackNET, International Standards Organization (ISO) ASCII interface, and an ISONAS Active DLL interface (ADI). Other interfaces or utilities may be included in addition to those shown in FIG. 3.

The UI administrator 308 can manage various aspects of the access control system 100, such as, but not limited to, system configuration, schedule, personnel access, and reader/controller configuration. The UI monitor 310 monitors the state of the access control system 100, and may responsively cause statuses to change. For example, the UI monitor 310 can monitor access control history, and floor plans, and may lock or unlock doors or clear alarms by sending the appropriate commands to the reader/testers 102.

Exemplary Operations

Figure 4:
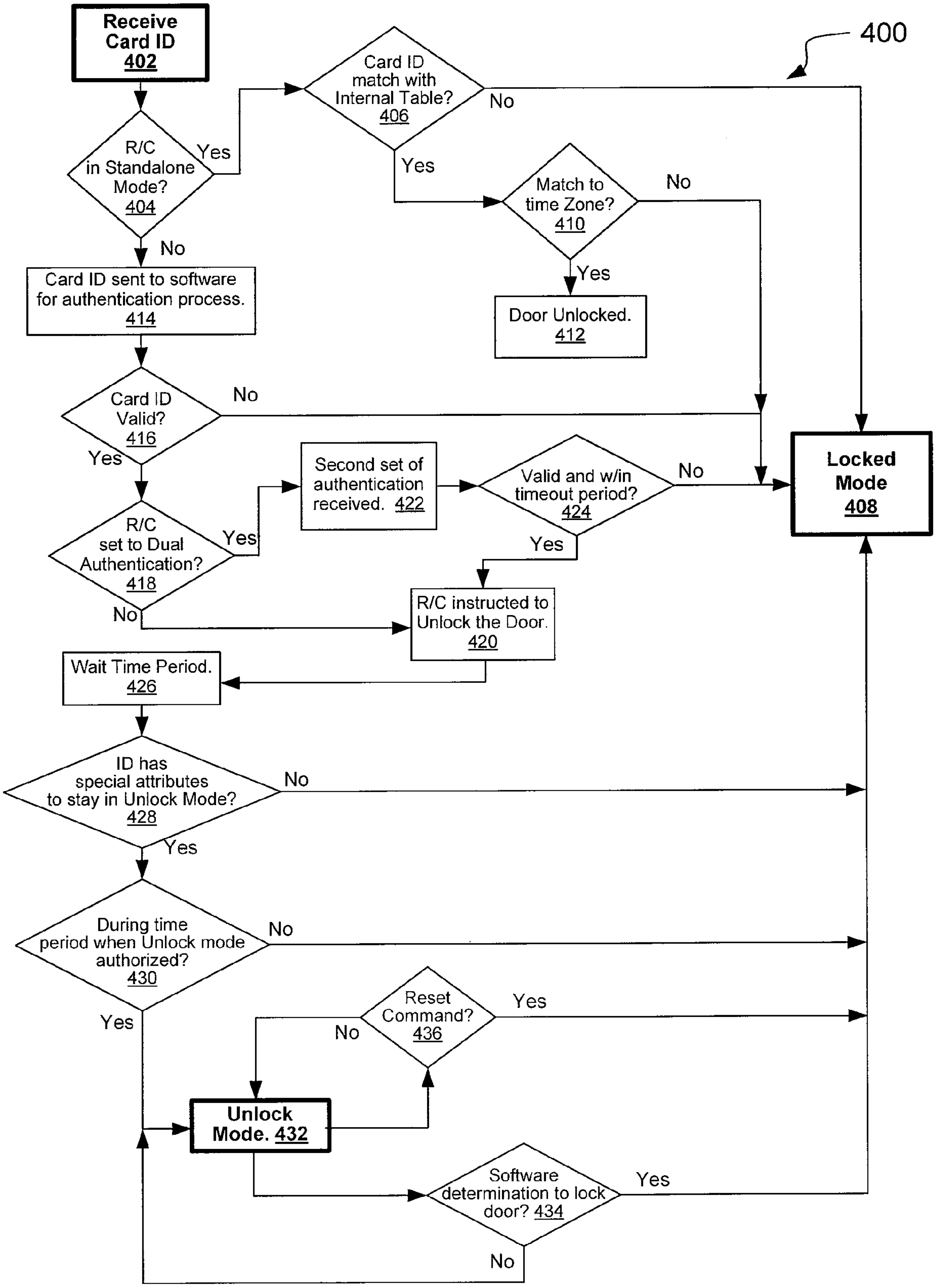
FIG. 4 is a flowchart illustrating an authentication and control algorithm that can be carried out by an access control system in accordance with an embodiment of the present invention.

FIG. 4 is a flowchart illustrating an access control algorithm 400 that authenticates individuals attempting to gain access through a locked door, which is controlled by an access control system in accordance with an embodiment of the present invention. Access control algorithm 400 is illustrative of an access control system algorithm, but the present invention is not limited to the particular order of operations shown in the FIG. 4. Operations in FIG. 4 may be rearranged, combined, and/or broken out as suitable for any particular implementation, without straying from the scope of the present invention.

As discussed above, the card reader of the access control system may enter in multiple modes, such as standalone mode, network mode, synchronous mode, and asynchronous mode. The modes can be relevant to the process by which the access control system authenticates a user and controls the state of the door. Prior to beginning the algorithm 400, it is assumed that a person has swiped an access control card, or a similar type of card, at the card reader of the access control system.

The access control algorithm 400, receives a card identifier (ID) at receiving operation 402. If the reader/controller is in standalone mode 404, then the card ID is authenticated against entries in one or more internal tables stored in the reader/controller. The internal tables include entries of "allowed" card IDs. The internal tables may be stored in RAM on the reader/controller. The internal table is scanned for an entry that matches the card ID 406. If there is no match, then the door will remain in Locked Mode 408.

If a matching entry is found, a determination is made whether the card ID is authorized to have access at this location (e.g., office, building, site, etc.) at the current time. The time that the card was read is compared with entries in a time zone table. In one embodiment, the time zone table include 32 separate time zones. If the card ID is found in the internal table 406 and if there is a match on the time zone 408, then a signal is sent to unlock the door 412.

In one embodiment of the present invention, the card ID is sent to a backend access control server that executes software for performing an authentication process 414. The authentication process 414 determines if the card ID is valid 416. Determining whether the card ID is valid can be done using card ID tables as was discussed above with respect to operation 406. If the authentication process determines that the card ID is valid, then the access control algorithm 400 determines if the reader/controller is set to dual authentication 418. If the reader/controller is not set to dual authentication then the reader/controller is instructed to unlock the door 420.

If the reader/controller is set to dual authentication, then two forms of identity need to be presented at a specific location. The first form of authentication may be the card presented to the reader/controller. The second form of authentication may be, but is not limited to, a PIN number entered on a pin pad or identification entered on a biometric device. When the access control algorithm 400 is set to dual authentication then the software delays response to the reader/controller so as to receive the second set of authentication 422. It is then determined if the second set of authentication is valid and received within a user-defined timeout period 424. If the second set of authentication is determined to be valid and is received prior to a user-defined timeout period, then the software sends the reader/controller a signal authorizing the door to be unlocked 420. If the second set of authentication is not valid or not received within the user-defined timeout period then no signal is sent to authorize the door to be unlocked and the door remains in the Locked Mode 408.

In one embodiment, a pin pad is integrated with (e.g., attached to) the housing of reader/controller 102. In another embodiment, the pin pad is separate from the housing of reader/controller 102 and is connected with communication module 206 via a wired or wireless communication link.

In one embodiment, after the reader/controller instructs the door to unlock 420, the door will remain unlocked for a second user-defined period 426. In one embodiment the card ID may have an attribute that will signal for the door to remain in unlock mode. The access control algorithm 400 determines if the card ID has the attribute to remain in unlock mode 428. If the card ID does not have the attribute, then after the second user-defined timed period the door will return to Locked Mode 408. If the card ID does have the attribute that will signal the door to remain in unlock mode, then it is determined if the card ID was presented during a time period for which the unlock mode is authorized 430. If the card ID was not presented during a time period for which the unlock mode is authorized, then the door will return to Locked Mode 408. However, the door will remain in Unlock Mode 432 if the card was presented during a time period for which the unlock mode is authorized.

In one embodiment, the Unlock Mode 432 may have been set by the card ID discussed above. The Unlock Mode 432 may also be, for example, but without limitation, sent from an unlock command originating from the software.

In one embodiment, the door will remain in the Unlock Mode 432 until such a time that the software determines is time to lock the door 434. At that software-determined time, the door will return to Locked Mode 408.

In one embodiment, at the end of every defined shift for which a reader/controller is authorized to accept cards, the software will send out a reset command to the reader/controller 436 if the current state of the reader/controller is in Unlock Mode. If a reset command is sent, the reader/controller will return to the Locked Mode 408.

Figure 5:
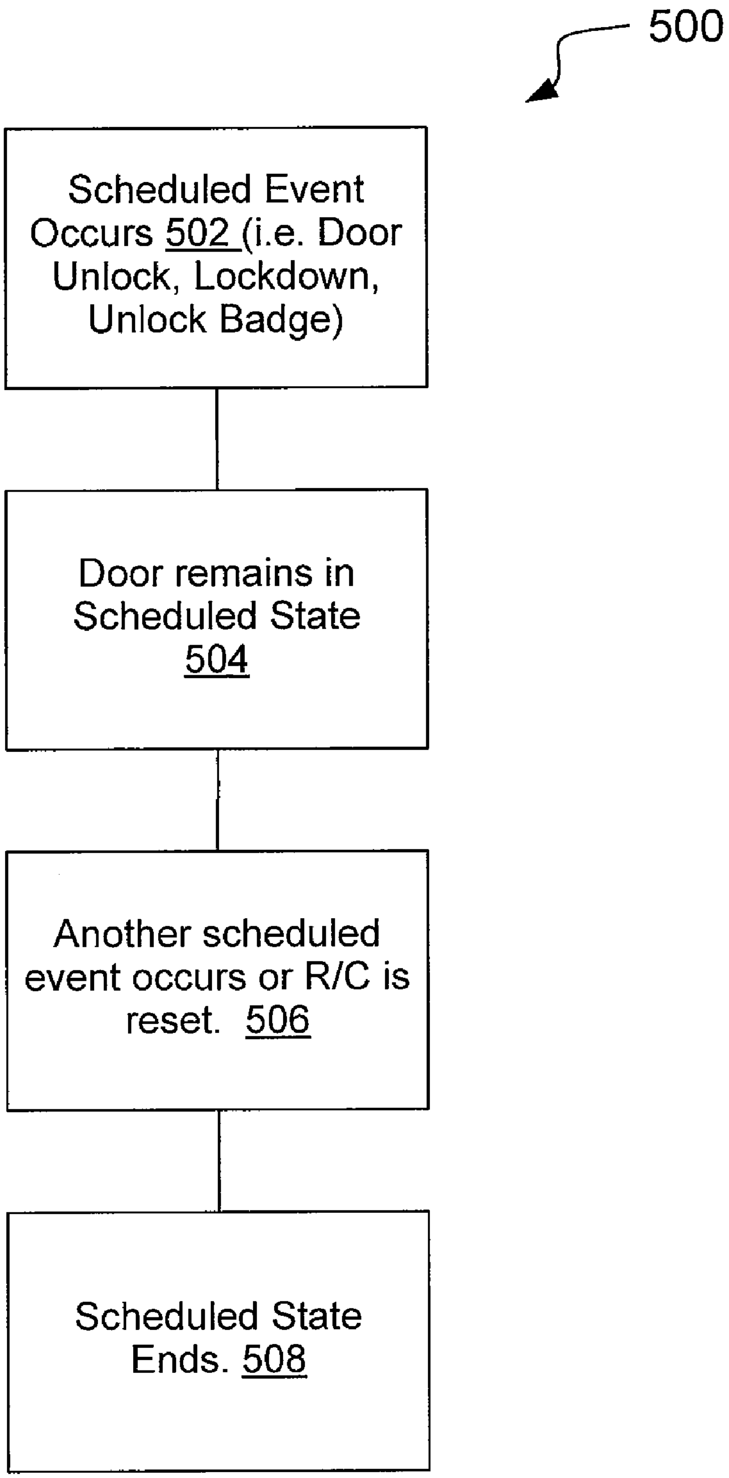
FIG. 5 is a flowchart illustrating a preconfigured event driven access control algorithm in accordance with one embodiment.

FIG. 5 is a flowchart illustrating one embodiment of a preconfigured event-driven access control algorithm 500. The software may be configured to perform a scheduled event at the reader/controller on a specific date and time 502. In one embodiment there are three types of events that are scheduled: (1) a door unlock event, (2) a lockdown event, and (3) an unlock badge event. Once one of the scheduled events has taken place, the reader/controller will cause the door to remain in the scheduled state 504 until either another scheduled event takes place or the reader/controller is reset to normal operations 506 at which point the scheduled state ends 508.

In one embodiment the door unlock event will cause the reader/controller to go into unlock mode, meaning the associated relay will be active and the two LEDS will be green.

In one embodiment the lockdown event will cause the door to lock and stay locked regardless of any cards presented to the reader/controller. When the reader/controller is in the lockdown state, the two LEDS will be red.

In one embodiment the unlock badge event will cause the reader/controller to operate normally until the next valid badge is presented, at which time the reader/controller will go into unlock mode.

Exemplary Computing Device

Figure 6:
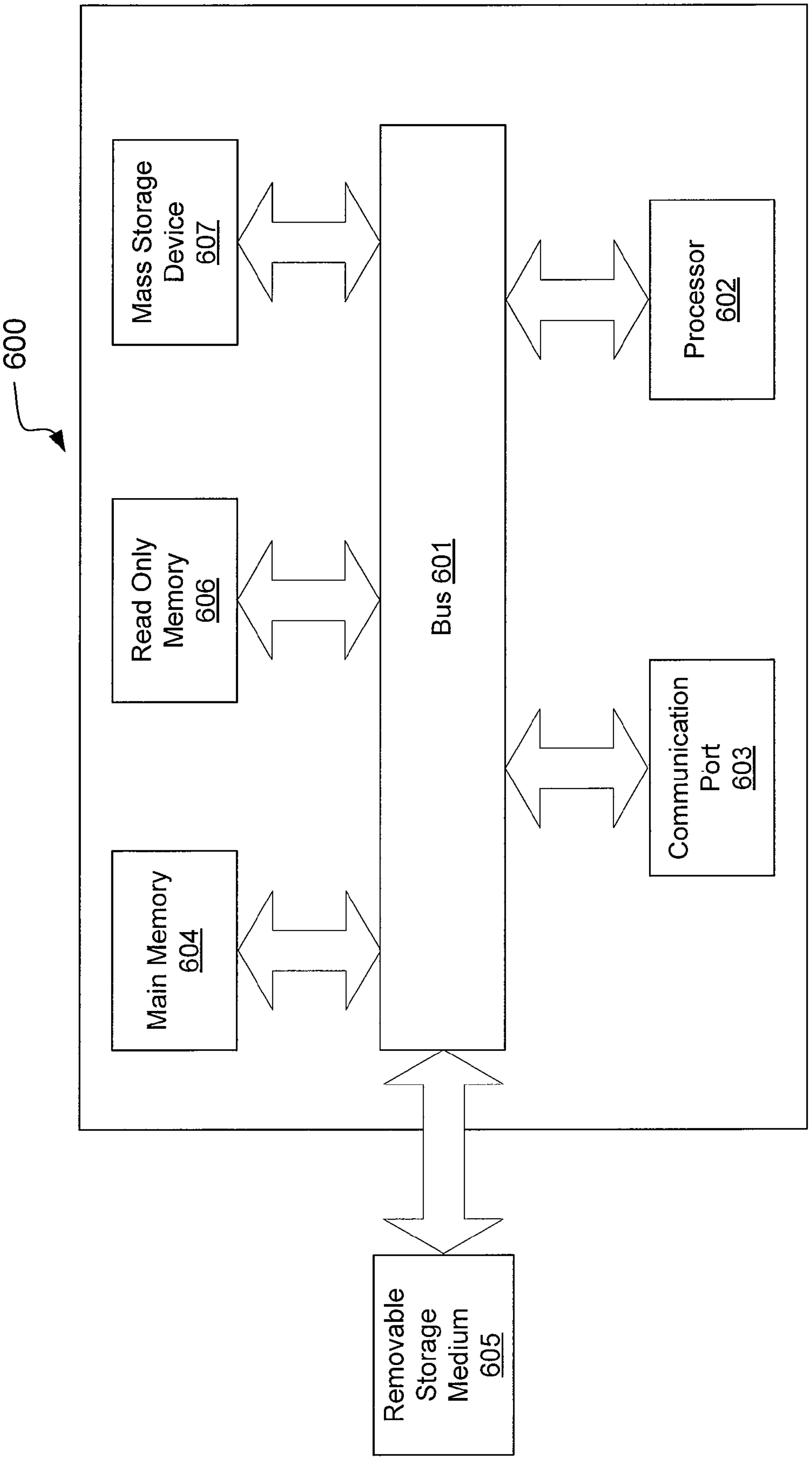
FIG. 6 is a schematic diagram of a computing device upon which embodiments of the present invention may be implemented and carried out.

FIG. 6 is a schematic diagram of a computing device upon which embodiments of the present invention may be implemented and carried out. The components of computing device 600 are illustrative of components that an access control server and/or a reader/controller may include. However, any particular computing device may or may not have all of the components illustrated. In addition, any given computing device may have more components than those illustrated.

As discussed herein, embodiments of the present invention include various steps. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

According to the present example, the computing device 600 includes a bus 601, at least one processor 602, at least one communication port 603, a main memory 604, a removable storage medium 605 a read only memory 606, and a mass storage 607. Processor(s) 602 can be any known processor such as, without limitation, an INTEL ITANIUM or ITANIUM 2 processor(s), AMD OPTERON or ATHLON MP processor(s), or MOTOROLA lines of processors. Communication port(s) 603 can be any of an RS-232 port for use with a serial connection, a 10/100 Ethernet port, or a Gigabit port using copper or fiber. Communication port(s) 603 may be chosen depending on a network such a Local Area Network (LAN), Wide Area Network (WAN), or any network to which the computing device 600 connects. The computing device 600 may be in communication with peripheral devices (not shown) such as, but not limited to, printers, speakers, cameras, microphones, or scanners.

Main memory 604 can be Random Access Memory (RAM), or any other dynamic storage device(s) commonly known in the art. Read only memory 606 can be any static storage device(s) such as Programmable Read Only Memory (PROM) chips for storing static information such as instructions for processor 602. Mass storage 607 can be used to store information and instructions. For example, hard disks such as the Adaptec® family of SCSI drives, an optical disc, an array of disks such as RAID, such as the Adaptec family of RAID drives, or any other mass storage devices may be used.

Bus 601 communicatively couples processor(s) 602 with the other memory, storage and communication blocks. Bus 601 can be a PCI/PCI-X, SCSI, or USB based system bus (or other) depending on the storage devices used. Removable storage medium 605 can be, without limitation, any kind of external hard-drive, floppy drive, IOMEGA ZIP DRIVE, flash-memory-based drive, Compact Disc-Read Only Memory (CD-ROM), Compact Disc-Re-Writable (CD-RW), or Digital Video Disk-Read Only Memory (DVD-ROM). In some embodiments, the computing device 600 may include multiple removable storage media 605.

In conclusion, the present invention provides, among other things, a method and system for controlling access to an enclosed area. Those skilled in the art can readily recognize that numerous variations and substitutions may be made in the invention, its use, and its configuration to achieve substantially the same results as achieved by the embodiments described herein. Accordingly, there is no intention to limit the invention to the disclosed exemplary forms. Many variations, modifications, and alternative constructions fall within the scope and spirit of the disclosed invention as expressed in the claims.

What is claimed is:

1. A method for controlling access to an enclosed area, the method comprising:

receiving a card identification signal including a card identifier (ID) in an access card reader and controller associated with an entrance to the enclosed area, the access card reader and controller being powered via a Power-over-Ethernet (PoE) interface;

determining an operational mode of the access card reader and controller, the operational modes including a standalone mode and a network mode;

authenticating the card ID by transmitting the card ID to an access control server when the access card reader and controller is determined to be operating in the network mode;

authenticating the card ID against entries of one or more internal tables stored in the access card reader and controller when the access card reader and controller is determined to be operating in the standalone mode; and sending a signal to unlock a door at the entrance to the enclosed area associated with the access card reader and controller when the card ID has been successfully authenticated;

wherein the access card reader and controller serves, from the access card reader and controller to a Web browser external to the access card reader and controller, one or more Web pages by which a user can configure the access card reader and controller.

2. The method of claim 1, wherein the card ID is transmitted to the access control server via a wireless communication link.

3. The method of claim 1, wherein the card identification signal is received from a radio-frequency identification (RFID) transponder included in an access control card.

4. The method of claim 1, wherein the operational modes include at least one of a synchronous mode and an asynchronous mode, the access card reader and controller being periodically polled by the access control server in the synchronous mode, the access card reader and controller operating without being periodically polled by the access control server in the asynchronous mode.

5. The method of claim 1, wherein data transmitted between the access card reader and controller and the access control server are encrypted.

6. An access card reader and controller for controlling access to an enclosed area, the access card reader and controller comprising:

a radio-frequency communication module configured to receive a card identification signal including a card identifier (ID);

a mode module configured to determine an operational mode of the access card reader and controller, the operational modes including a standalone mode and a network mode;

a communication module configured to authenticate the card ID by transmitting the card ID to an access control server when the access card reader and controller is determined to be operating in the network mode;

a local authentication module configured to authenticate the card ID against entries of one or more internal tables stored in the access card reader and controller when the access card reader and controller is determined to be operating in the standalone mode; and a local input/output module configured to send a signal to unlock a door at an entrance to the enclosed area when the card ID has been successfully authenticated;

wherein the access card reader and controller is powered via a Power-over-Ethernet (PoE) interface of the communication module and wherein the communication module includes a secure HTTP interface to serve, from the access card reader and controller to a Web browser external to the access card reader and controller, one or more Web pages by which a user can configure the access card reader and controller.

7. The access card reader and controller of claim 6, further comprising:

a pin pad with which to enter a personal identification number (PIN), the pin pad being connected with the communication module.

8. The access card reader and controller of claim 7, wherein the pin pad is integrated with a housing of the access card reader and controller.

9. The access card reader and controller of claim 7, wherein the pin pad is separate from a housing of the access card reader and controller and is connected with the communication module via one of a wired and a wireless link.

10. The access card reader and controller of claim 6, further comprising:

a local tamper detector configured to detect when the access card reader and controller is being tampered with.

11. The access card reader and controller of claim 6, wherein the communication module includes at least one of a serial interface, a TCP/IP interface, an IEEE 802.11 interface, and an IEEE 802.15.4 interface.

12. The access card reader and controller of claim 6, wherein the communication module is configured to transmit the card ID to the access control server via a wireless communication link.

13. The access card reader and controller of claim 6, wherein the radio-frequency communication module receives the card identification signal from a radio-frequency identification (RFID) transponder included in an access control card.

14. The access card reader and controller of claim 6, wherein the operational modes include at least one of a synchronous mode and an asynchronous mode, the access card reader and controller being periodically polled by the access control server in the synchronous mode, the access card reader and controller operating without being periodically polled by the access control server in the asynchronous mode.

15. The access card reader and controller of claim 6, wherein data transmitted between the access card reader and controller and the access control server are encrypted.

16. A system for controlling access to one or more enclosed areas, the system comprising:

at least one access card reader and controller powered via a Power-over-Ethernet (PoE) interface, each access card reader and controller being capable of controlling access through a particular entrance to a particular enclosed area, each access card reader and controller being configured to serve, from the access card reader and controller to a Web browser external to the access card reader and controller, one or more Web pages by which a user can configure that access card reader and controller; and an access control server in communication with the at least one access card reader and controller, the access control server being capable of controlling the operation of the at least one access card reader and controller;

wherein, in a network mode of operation, the access control server is configured to perform authentication of a card identifier (ID) received from the at least one access card reader and controller and to signal the at least one access card reader and controller to unlock a door at the particular entrance to the particular enclosed area when the access control server has successfully authenticated the received card ID;

wherein, in a standalone mode of operation, the at least one access card reader and controller is configured to perform local authentication of a received card ID independently of the access control server and to unlock a door at the particular entrance to the particular enclosed area when the at least one access card reader and controller has successfully authenticated the received card ID.

17. The system of claim 16, wherein the at least one access card reader and controller is configured to enter the standalone mode of operation automatically when the access control server fails.

18. The system of claim 17, wherein, after having automatically entered the standalone mode of operation in response to a failure of the access control server, the at least one access card reader and controller is configured to re-enter the network mode of operation automatically once the access control server has resumed normal operation.

19. The system of claim 16, wherein the access control server is configured to detect automatically that an access card reader and controller has been added to the system.

20. The system of claim 16, wherein the at least one access card reader and controller is capable of operating in at least one of a synchronous mode and an asynchronous mode, the access card reader and controller being periodically polled by the access control server in the synchronous mode, the access card reader and controller operating without being periodically polled by the access control server in the asynchronous mode.

* * * * *